United States Patent [19]

Burysek et al.

[11] Patent Number: 4,907,755
[45] Date of Patent: Mar. 13, 1990

[54] COP TUBE FEEDING DEVICE FOR TEXTILE MACHINES

[75] Inventors: Frantisek Burysek; Frantisek Hortlík, both of Ústí nad Orlicí, Czechoslovakia

[73] Assignee: Yýzkumný Ústav Bavlnársk, Ústi nad Orlicí, Czechoslovakia

[21] Appl. No.: 256,439

[22] Filed: Oct. 12, 1988

[51] Int. Cl.⁴ .............................................. B65H 67/06
[52] U.S. Cl. ................................................ 242/35.5 A
[58] Field of Search ................... 242/35.5 A, 35.5 R, 242/18 R

[56] References Cited

U.S. PATENT DOCUMENTS

| | | | |
|---|---|---|---|
| 4,040,573 | 8/1977 | Burysek et al. | 242/35.5 A |
| 4,610,405 | 9/1986 | Noshi | 242/35.5 A |
| 4,772,171 | 9/1988 | Mayer et al. | 242/35.5 A X |

FOREIGN PATENT DOCUMENTS 2816418 10/1979 Fed. Rep. of Germany ..... 242/35.5 A

Primary Examiner—Stanley N. Gilreath
Attorney, Agent, or Firm—Beveridge, DeGrandi & Weilacher

[57] ABSTRACT

A device is provided which solves the problem of feeding cop tubes in a textile machine from a supply container to a withdrawing station by means of a conveyor disposed in a conveying channel extending along the machine above the spinning units. The conveying channel has a side wall and a lower horizontal support wall on the upper slide surface of which there is disposed an endless belt of the conveyor. Above the belt there is provided, on the one hand, at the beginning of the conveying channel, an outlet for the supply container for cop tubes to be deposited onto the endless belt, and, on the other hand, in a cop withdrawing station, a retaining unit for arresting the movement of the tube being supplied. The retaining unit comprises a catch which has a blocking arm with an abutting front end provided at the tube supply side and oriented across the endless belt of the conveyor, and a lifting arm with a contacting surface for engaging a tube traveling along the belt.

9 Claims, 2 Drawing Sheets

COP TUBE FEEDING DEVICE FOR TEXTILE MACHINES

FIELD OF THE INVENTION

The invention relates to a device for feeding cop tubes in a textile machine from a supply container to a withdrawing station above a spinning unit by means of a conveyor disposed in a part of the cross-section of a conveying channel fixedly attached to the machine frame and extending along the machine above the spinning units.

BACKGROUND OF THE INVENTION

Some prior art textile machines include working units which are each provided with a small box, containing empty tubes, from which the tubes are taken out or removed by the operator when full tubes are exchanged for empty ones, and which, after having been emptied, must be replenished.

To provide automation of the tube replenishment operation there have been developed machines including a stationary channel disposed along their working units, in which the tubes, arranged in the form of a column, are displaced from one working unit to the other (see, e.g., U.S. Pat. No. 4,040,573). Since the tube length is typically smaller than the spacing between the working units, it is not possible to locate the tube opposite the working unit, and thus withdrawal of tubes out of the channel cannot be automated without further provisions. In particular, in order to enable continuous operation of a travelling service unit, wherein he service unit exchanges the bobbins successively between one working unit and another, a device has been provided wherein the forward most or leading tube in the column is removed or withdrawn from the channel, and the entire tube column, just prior to this withdrawal, is shifted over a distance equal to a portion of spacing between the two adjoining units so that this leading tube can be accurately disposed opposite the respective working unit. However, this very simple solution of the problem fails in the the case of a so-called selective bobbin exchange, wherein the full bobbin is doffed after a precisely predetermined yarn length has been wound thereon. There is a necessity for such an exchange, due to the fact that statistical occurrences of thread breakages, particularly during long term machine operation, are distributed randomly along the machine. Although devices have been provided to avoid this disadvantage, common drawbacks of such devices include the considerable complexity of the devices, and difficult maintenance problems associated with them, which result in a frequent incidence of operational failures.

Thus, for instance, in the German Published Application DE-OS No. 35 35 354, there is described a stationary channel extending along the machine frame above the working or spinning units. The channel is provided with spaced apart transverse partitions defining a location for the tube for the given working unit. Above the channel, a chain conveyor is arranged which is provided with arms for carrying an empty tube above the tubes in the channel. If, after doffing a full bobbin, a tube has been removed from the channel, the tube carried by the arms of the conveyor is put in the free space in the channel. This solution is relatively complicated and expensive.

In European Patent Specification No. 149,980, there is disclosed a device having a stationary channel with a slot in its bottom, through which carriers of a stepwise movable conveyor pass. The conveyor is provided with a lever for lifting the carriers. After the exchange of a bobbin, the entire column of empty tubes is forwarded from one end of the machine up to the vacant location. Even though the needed tube supply is provided by this device, the device is, due to its relative complexity, considerably expensive.

SUMMARY OF THE INVENTION

It is an object of the invention to avoid the disadvantages of prior art as referred to hereinabove, and to provide an improved device for feeding empty tubes by means of a conveyor in a channel arranged along the machine above spinning units. The device of the invention is relatively simple, inexpensive and reliable in operation, and makes it possible to fully automatically supply the withdrawing station with an empty tube in any spinning unit and in optional sequence.

In accordance with the invention, a device is provided for feeding cop tube in a textile machine from a supply container to a withdrawing station above a spinning unit by means of a conveyor disposed in a part of cross-section of a conveying channel fixedly attached to the machine frame and extending along the machine above the spinning units, wherein the conveying channel includes a side wall and a lower horizontal support wall on the upper slide surface of which is disposed an endless belt of the conveyor. Above the endless belt there is provided, on the one hand, at the beginning of the conveying channel, an outlet of the supply container for cop tubes to be deposited onto the endless belt, and, on the other hand, in a cop withdrawing station, retaining means for arresting the movement of the tube being supplied.

The structure of the device of the invention is relatively simple because in order to provide transport of the tubes, a normal endless belt and a simple conveying channel are used. This is advantageous not only from the viewpoint of ease of manufacture but also from the perspective of reliable operation and inexpensive maintenance or service. Further, the construction of the retaining means is simple and inexpensive in that it comprises a catch in the form of two-arm lever mounted for pivoting or swinging about a pivot, the catch comprising, on the one hand, a blocking arm with an abutting front end provided at the tube supply side and oriented across the endless belt of the conveyor, and, on the other hand, a lifting arm with a contacting surface for engaging a traveling tube.

Other features and advantages will be described in, or apparent from, the detailed description of preferred embodiments of the invention which follows.

BRIEF DESCRIPTION OF THE DRAWINGS

Some of these preferred embodiments of the invention will hereinafter be described with reference to the accompanying schematic drawings, in which.

DESCRIPTION OF THE PREFERRED EMBODIMENTS

Figure 1:
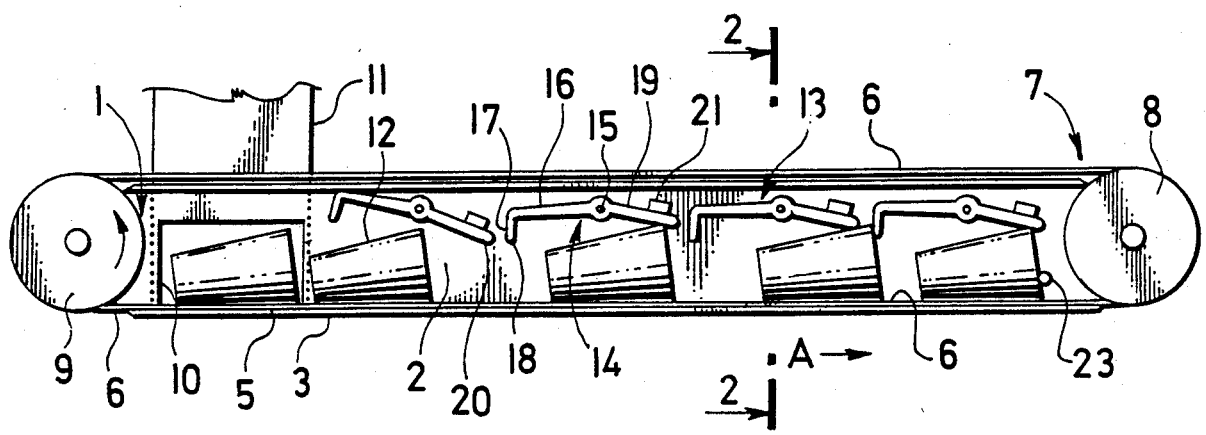
FIG. 1 is a side-elevational view of a cop tube feeding device, wherein all of the other active machine elements as well as the machine frame are omitted for purposes of clarity and simplicity of description.
Figure 2:
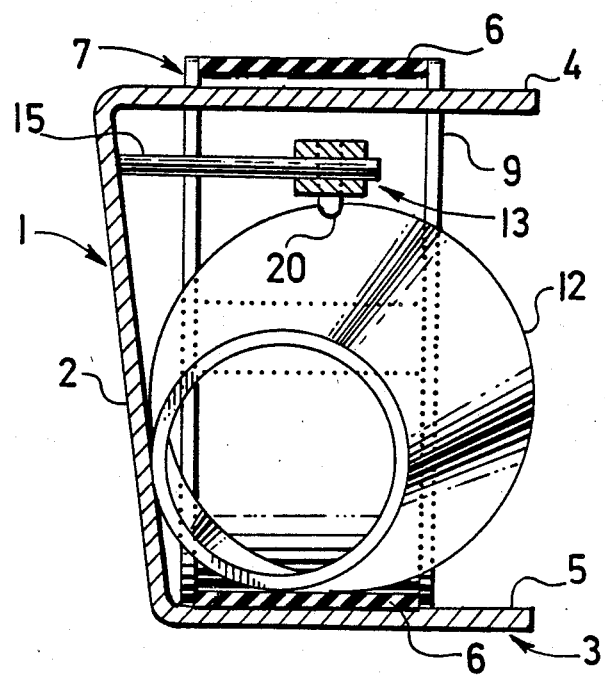
FIG. 2 is a section taken along the line II—II in FIG. 1.

As can be seen in the drawings, and in particular, in FIGS. 1 and 2 thereof, the cop tube feeding device of the invention comprises conveying channel 1 which is disposed above the spinning units (not shown) along the bobbin spooling arms (not shown) and which is secured to the machine frame (not shown). The conveying channel 1 has a substantially vertical side wall 2 and a lower, substantially horizontal support wall 3. The two walls 2 and 3 can, but need not be, perpendicular to each other. In addition to these walls 2 and 3, the channel 1 has an upper wall 4 so that channel 1 is reverse C-shaped (as viewed in FIG. 2) or U-shaped with the U turned on one side.

The lower wall 3 of the conveying channel 1 has an upper slide surface 5 serving as a support for a portion or leg (i.e., the lower portion in FIGS. 1, 2, 4 and 5) of an endless belt 6 of a conveyor 7 while the upper portion thereof is disposed above the upper wall 4 of the conveying channel 1. The flat endless belt 6 contacts two pulleys 8 and 9 which are mounted in a conventional manner at the respective ends of the machine and of which one pulley is positively driven. If the lower belt portion moves from the left to the right, in the direction of arrow A in FIG. 1, on the upper slide surface 5, an outlet 10 of a container 11 for empty tubes 12 is then provided adjacent the pulley 9. Since such containers, and the arrangement of the outlet thereof, are well-known, the container 11 and outlet 10 will not be described more in detail. Preferably, the outlet 10 of the tube container 11 is provided in the side wall 2 of the conveying channel 1 above the endless belt 6 onto which the tubes 12 are to be deposited.

At a tube withdrawing station as defined below there is provided a retaining unit or arrangement 13 for arresting the movement of the tube 12 being supplied. It is to be understood that the term "withdrawing station" refers to a region of the machine where a full bobbin is doffed and replaced by an empty tube. This station is typically provided above the spinning unit or another working unit. The tube withdrawing station can be located on or constituted by an automatic service unit travelling along the machine, or provided within the space above each of the spinning units (FIG. 1).

The retaining unit 13 provided in the tube withdrawing station, i.e., for example, immediately above the spinning unit in the conveying channel 1, comprises a catch 14, in the form of a two-arm lever, which is mounted for pivoting swinging about a pivot 15. The pivot 15 is fixed in a suitable manner in the vertical side wall 2 of the conveying channel 1 above the endless belt 6. The catch 14 includes a blocking arm 16 provided at the end thereof facing in the direction of the tube supply with an abutting front end 17 which is oriented across the belt 6 and which forms on the blocking arm 16 a blocking end or detent 18. The catch 14 also includes a lifting arm 19 with a contacting surface 20 designed to engage a tube 12 as the tube moves under the catch 14. The catch 14, and in particular, the lifting arm 19, is provided with a weight 21 for causing the blocking arm 16, together with the abutting front end 17, to pivot or swing into the inoperative position thereof outside the path of the tubes 12 as the tubes are carried along by the endless belt 6. As can be seen in FIG. 1, the lifting arm is lowered by the weight 21 while the blocking arm 16 is lifted into the position in which arm 16 engages and bears on the horizontal upper wall 4 of the conveying channel 1.

Figure 3:
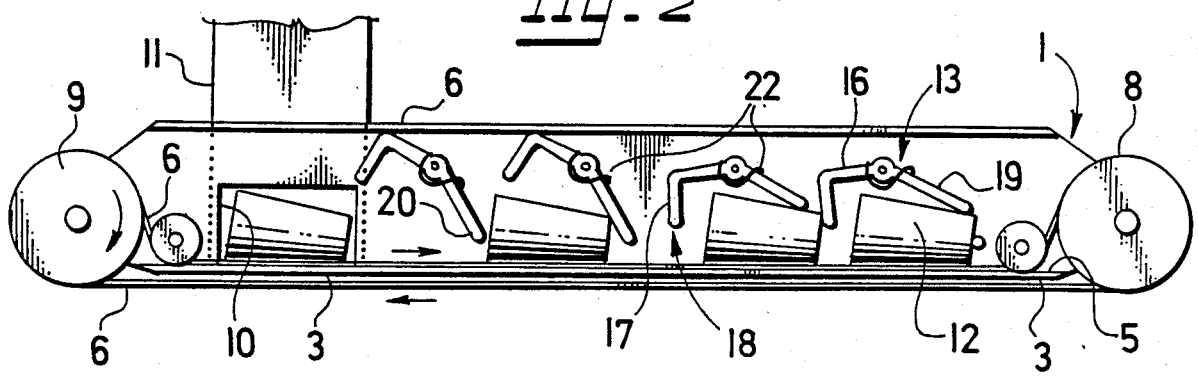
FIG. 3 shows an alternative embodiment of the cop tube device of the invention in a side-elevational view.

FIG. 3 shows another embodiment of the device of the invention wherein a similar retaining unit 13 is also provided in the conveying channel 1 above each spinning unit (not shown). In this embodiment, in lieu of the weight 21, the movement of unit 13 is controlled by a spring 22. One end of the spring 22 which extends around pivot 15 bears on the lifting arm 19 while the other end thereof bears on pivot 15. In this embodiment, the upper portion of the endless belt 6 is disposed on the upper slide surface 5 of the horizontal lower support wall 3 of the channel 1 while the lower portion thereof is disposed below the wall 3.

Figure 4:
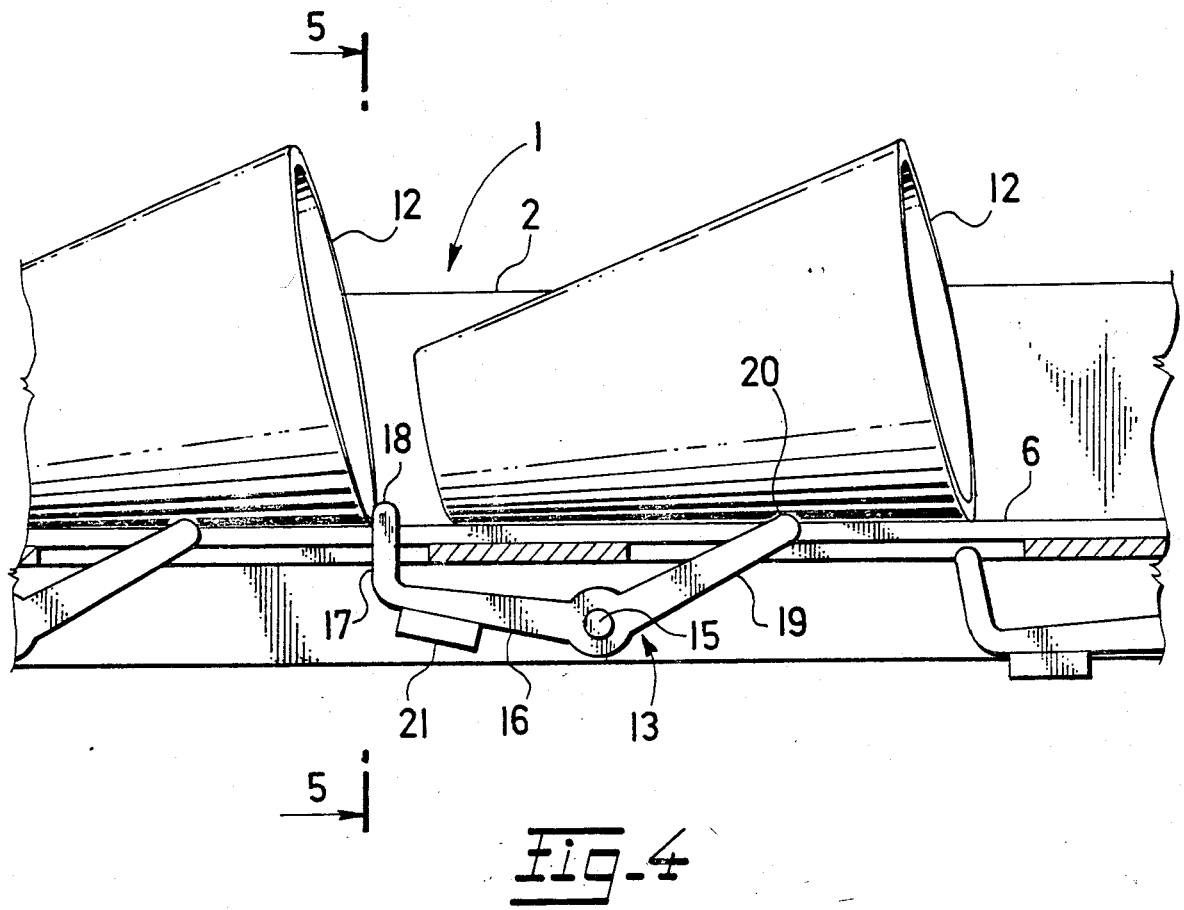
FIG. 4 is a detail side view showing a different embodiment of the retaining means.
Figure 5:
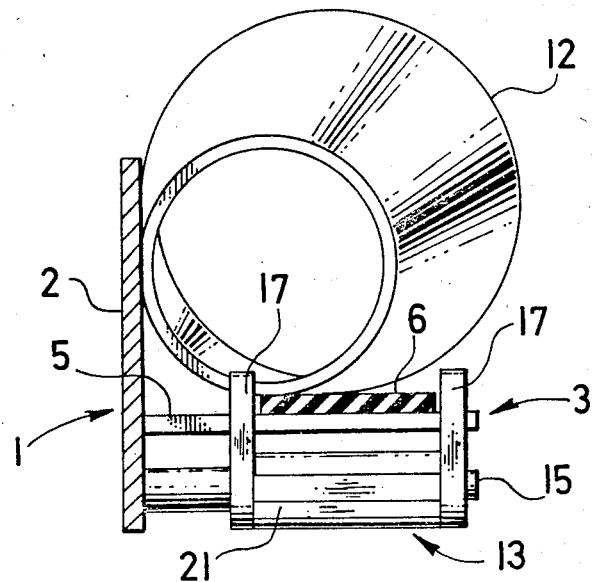
FIG. 5 is a section taken along the line V—V in FIG. 4.

FIGS. 4 and 5 shows another alternative embodiment of the device of the invention. In this embodiment, the pivot 15 carrying the catch 14 is affixed to the vertical side wall 2 of the conveying channel 1 under the endless belt 6 and the lower horizontal support wall 3 of the channel 1. Catch 14 has the opposite orientation relative to the tubes 12 carried along by the endless belt 6 as compared with that shown in FIGS. 1, 2 and 3; in particular, the abutting front end 17 of the blocking arm 16 together with the blocking end or detent 18 is oriented upwardly while the weight 21 is provided on said blocking arm 16 so as to, in operation, lower said arm 16 downwardly outside of the path of travel of the tubes 12.

As can be seen in the sectional view in FIG. 5, the two arms of the catch 14 are doubled, i.e., each take the form of a double arm construction, as indicated by the front ends 17 of arm 16, and extend upwardly so as to overlap the endless belt 6 at both sides thereof. In this embodiment, the lateral edges of the endless belt 6 are overlapped by the tube 12 in order that the tube may come into operational engagement with the blocking detent 18 and the contacting surface 20 of the two arms 16 and 19, respectively. Preferably, the endless belt 6, at the side thereof facing (and in engagement with) the tubes 12, is provided with an anti-slip surface such as provided by suitable roughening, or a layer of material having a high coefficient of friction, in order to obtain a maximum frictional force for carrying the tubes 12 therealong.

Considering the operation of the device of the invention, in an initial phase thereof, the endless belt 6 is set in motion in the direction of arrow A and a first tube 12 from the container 11 is then deposited thereon. This tube is then carried along the conveying channel 1 to a withdrawing station defined by the retaining unit 13, i.e., by catch 14. Due to the presence of weight 21, the blocking arm 16 is held in its uppermost position, i.e., outside the path of the tube 12 being carried along the conveyor. During further movement thereof, the tube 12 abuts the contacting surface 20 of the lifting arm 19 whereby the latter, acting against the moment (force) produced by the weight 21 (FIG. 1) or the spring 22 (FIG. 3), is swung upwardly so that the opposite blocking arm 16 of he catch 14 is lowered, and the abutting front end 17 (or detent 18) is moved into the tube transport path and arrests or stops the next adjacent tube 12. Since the endless belt 6 is smooth, i.e., substantially free of any protuberances or projecting portions, and the tube 12 has a negligible weight, the belt 6 can either slip under the stopped tube, or can be stopped.

Continuing the description of the operation, the tube 12 is arrested by the retaining unit 13 in the withdrawing station as long as the tube is engaged by the contacting surface 20 against the force exerted by the weight 21, or spring 22, respectively. In cases where the retaining unit 13 is associated with each of the spinning units (not shown) of the machine and the conveyor 7 is not yet completely filled up, the leading tube 12 is not prevented from being further carried along by the endless belt 6 when the surface 20 of the catch 14 move out of contact with the tube 12. Thus, the blocking arm 16 of the catch is lifted, and the abutting from end 17 thereof is moved outside the path of tube transport so that the next tube 12 is allowed to move forward. The process is successively repeated at each of the spinning units until the conveyor 7 is completely full. Finally, the leading tube 12 abuts a stop 23 provided in the conveying channel 1. In this phase all of the withdrawing stations of the conveyor 7 are filled up with the tubes 12 and the endless belt can slip under these tubes. The belt 6 can now be stopped until a tube is withdrawn therefrom. On the other hand, because the toughness of material the belts 6 are made of, and to the very light weight of the tube 12, the belt 6 can also be left in continuous operation.

If a tube 12 is now withdrawn from any of the withdrawing stations by an automatic service unit (not shown), the respective catch 14 is released and the abutting front end 17 thereof is withdrawn out of the tube transport path. In this way the next adjacent tube is allowed to occupy its place so that the catch 14 is in turn released. Thus, all of the free places on the belt 6 are successively filled up until, at the beginning of the conveying channel 1, the last tube 12 is removed from the container 11, or manually placed on the belt. At this time the conveying channel 1 is filled up again and the endless belt 6 can be stopped.

It should be clear from the foregoing that the invention provides a device for automatically replenishing the conveyor with cop tubes through the use of a simple construction which is easy to manufacture. As compared with known devices of the prior art, the device according to the invention is more reliable, simpler and more economical, which are essential advantages of the invention.

Although the present invention has been described relative to exemplary embodiments thereof, it will be understood by those skilled in the art that variations and modifications can be effected in these exemplary embodiments without departing from the scope and spirit of the invention.

We claim:

1. A device for feeding cop tubes from a supply container to a withdrawing station of a textile machine, comprising:
    a conveying channel extending along and being attached to the textile machine, said channel including a side wall and a lower horizontal support wall having an upper slide surface;
    a conveyor being disposed partly in the cross-section of said channel, said conveyor including an endless belt, guided over said slide surface of said channel, for carrying the tubes along said channel to a withdrawing station of the textile machine;
    a supply container for depositing the cop tubes onto said endless belt, said supply container having an outlet disposed at the upstream end of said channel and above said endless belt; and
    retaining means, at the withdrawing station, for arresting movement of the tubes along said endless belt.

2. A device according to claim 1, wherein said retaining means is provided in said conveying channel.

3. A device according to claim 1, wherein said retaining means comprises a catch having a blocking arm extending toward the upstream end of said conveying channel and a lifting arm extending toward the downstream end of said conveying channel, said blockig arm having an abutting front end, oriented across said endless belt, for abutting with the tube, said lifting arm having a contacting surface for engaging the tube.

4. A device according to claim 3, wherein said catch is provided with a weight for normally biasing said blocking arm, including the abutting front end thereof, into an inoperative position outside the path of travel of the tubes carried by said endless belt.

5. A device according to claim 3, wherein a pivot for said catch is affixed to said side wall of said conveying channel above said endless belt.

6. A device according to claim 3, wherein a pivot for said catch is affixed to said side wall of said conveying channel under said endless belt and said lower horizontal support wall, said blocking arm and said lifting arm of said catch each comprising double arms for pivoting upwardly above and on both sides of said endless belt.

7. A device according to claim 3, wherein said catch is coupled to a spring for normally biasing said blocking arm, including the abutting front end thereof, into an inoperative position outside the path of travel of the tubes carried by said endless belt.

8. A device according to claim 1, wherein the tube carrying surface of said endless belt is provided with an anti-slip pattern thereon.

9. A device according to claim 1, wherein the tube carrying surface of said endless belt is provided with a layer of material having a high coefficient of friction.

* * * * *